United States Patent
Haldar

(10) Patent No.: US 11,151,068 B1
(45) Date of Patent: *Oct. 19, 2021

(54) ENHANCED SECURE DIGITAL (SD) DIRECT COMMAND FOR IMPROVED META-CHANNEL COMMUNICATIONS

(71) Applicant: QUALCOMM Incorporated, San Diego, CA (US)

(72) Inventor: Kishalay Haldar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/934,518

(22) Filed: Jul. 21, 2020

(51) Int. Cl.
 *G06F 13/28* (2006.01)
 *G06F 21/60* (2013.01)

(52) U.S. Cl.
 CPC .......... *G06F 13/28* (2013.01); *G06F 21/606* (2013.01)

(58) Field of Classification Search
 CPC .............................. G06F 13/28; G06F 21/606
 See application file for complete search history.

(56) References Cited

U.S. PATENT DOCUMENTS

| | | | | |
|---|---|---|---|---|
| 10,467,175 | B1* | 11/2019 | Haldar | G06F 13/4243 |
| 2014/0126559 | A1* | 5/2014 | Lynch | H04W 28/065 |
| | | | | 370/338 |
| 2016/0085701 | A1* | 3/2016 | Mirza | G06F 12/1081 |
| | | | | 710/308 |
| 2018/0004558 | A1* | 1/2018 | Das Sharma | G06F 13/1663 |

* cited by examiner

*Primary Examiner* — Henry Tsai
*Assistant Examiner* — John B Roche
(74) *Attorney, Agent, or Firm* — Seyfarth Shaw LLP/Qualcomm Incorporated

(57) ABSTRACT

A method of improving meta-channel communications over a secure digital (SD) bus between an SD host and an SD client is described. The method includes accessing, during a current data transfer over data lines of the SD bus, a first direct memory access (DMA) metadata and a second DMA metadata over a command (CMD) line of the SD bus using an enhanced SD direct command. The method also includes establishing, prior to a next data transfer over the data lines of the SD bus, a DMA configuration for the next data transfer based on the first DMA metadata and the second DMA metadata. The method further includes communicating the next data transfer over the data lines of the SD bus according to the DMA configuration.

20 Claims, 7 Drawing Sheets

ENHANCED SECURE DIGITAL (SD) DIRECT COMMAND FOR IMPROVED META-CHANNEL COMMUNICATIONS

BACKGROUND

Field

The present disclosure generally relates to apparatuses incorporating integrated circuits (ICs). More specifically, aspects of the present disclosure relate to an enhanced secure digital (SD) direct command for fast meta-channel communications.

Background

Various types of communications links and communications protocols are used for interconnecting devices and allowing interconnected devices to communicate with one another. Communications links use different methods for controlling the flow of commands and data between interconnected devices. For example, one device may operate as a master of a communications link, while other devices operate as slaves on the communications link. In this master/slave configuration, the master device issues commands on the communications link that permit the slave devices to communicate. If a particular slave device does not receive an appropriate command, then the device does not transmit on the communications link. A single master device, therefore, controls the flow of commands and data on the communications link.

A particular system for communicating with client devices is provided by a secure digital (SD) input/output (SDIO) protocol. The SDIO protocol is useful for two-way communications with the client devices in a computer system. The SDIO protocol relies on an SDIO host to communicate with client devices within a personal computer (PC) or other mobile computing device. The SDIO host operates as an SDIO master and controls other SDIO slave devices connected to the SDIO host. Data flow is controlled and monitored by the SDIO host.

The SDIO protocol is entirely host/master driven. Slave devices operating according to the SDIO protocol cannot initiate any transfer of data because these slave devices are limited to raising an interrupt to the host/master. This lack of communications from the slave devices complicates direct memory access (DMA) allocation by both host and client device drivers. It would, therefore, be desirable to provide a system for permitting communications between slave devices and the SDIO host/master to improve throughput using a DMA allocation.

SUMMARY

A method of improving meta-channel communications over a secure digital (SD) bus between an SD host and an SD client is described. The method includes accessing, during a current data transfer over data lines of the SD bus, a first direct memory access (DMA) metadata and a second DMA metadata over a command (CMD) line of the SD bus using an enhanced SD direct command. The method also includes establishing, prior to a next data transfer over the data lines of the SD bus, a DMA configuration for the next data transfer based on the first DMA metadata and the second DMA metadata. The method further includes communicating the next data transfer over the data lines of the SD bus according to the DMA configuration.

An apparatus configured to improve meta-channel communications over a secure digital (SD) bus between an SD host and an SD client is described. The apparatus includes a memory composed of an SD device and a processor(s) coupled to the memory. The processor is configured to access, during a current data transfer over data lines of the SD bus, a first direct memory access (DMA) metadata and a second DMA metadata over a command (CMD) line of the SD bus using an enhanced SD direct command. The processor is also configured to establish, prior to a next data transfer over the data lines of the SD bus, a DMA configuration for the next data transfer based on the first DMA metadata and the second DMA metadata. The processor is further configured to communicate the next data transfer over the data lines of the SD bus according to the DMA configuration.

A non-transitory computer-readable medium having program code recorded thereon to improve meta-channel communications over a secure digital (SD) bus between an SD host and an SD client is described. The program code is executed by a processor. The non-transitory computer-readable medium includes program code to access, during a current data transfer over data lines of the SD bus, a first direct memory access (DMA) metadata and a second DMA metadata over a command (CMD) line of the SD bus using an enhanced SD direct command. The non-transitory computer-readable medium also includes program code to establish, prior to a next data transfer over the data lines of the SD bus, a DMA configuration for the next data transfer based on the first DMA metadata and the second DMA metadata. The non-transitory computer-readable medium further includes program code to communicate the next data transfer over the data lines of the SD bus according to the DMA configuration.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily used as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
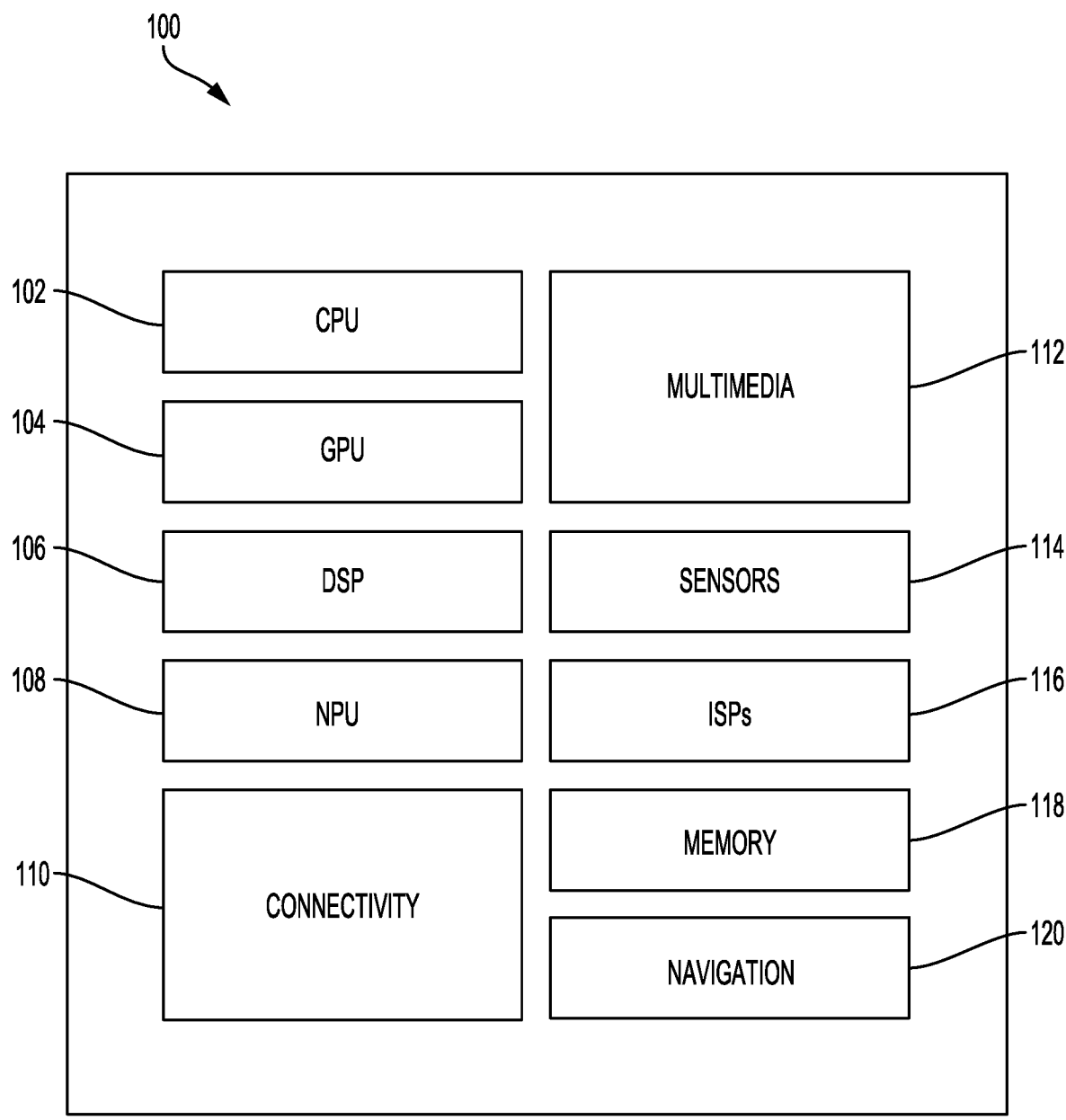
FIG. 1 illustrates an example implementation of a host system-on-a-chip (SOC), which includes a connectivity block configured to provide an enhanced secure digital (SD) direct command over an SD bus to increase meta-channel communications, in accordance with aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

As described herein, the use of the term "and/or" is intended to represent an "inclusive OR", and the use of the term "or" is intended to represent an "exclusive OR". The word "exemplary" is used to mean "serving as an example, instance, or illustration." Any aspect described herein as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Various types of communications links and communications protocols are used for interconnecting devices and allowing interconnected devices to communicate with one another. A particular system for communicating with client devices is provided by a secure digital (SD) input/output (SDIO) protocol. The SDIO protocol is useful for host initiated two-way communications with the client devices in a computer system. The SDIO protocol relies on an SDIO host to communicate with client devices within a personal computer (PC) or other mobile computing device. The SDIO host operates as an SDIO master and controls other SDIO slave devices connected to the SDIO host. Data flow is controlled and monitored by the SDIO host.

The SDIO protocol is entirely host/master driven. Slave devices operating according to the SDIO protocol cannot initiate data transfer on an SD bus communicably coupling the slave devices and the host/master. This lack of communications from the slave devices complicates direct memory access (DMA) allocation by both host and client device drivers. It is, therefore, desirable to provide a system for permitting communications between an SD client device and an SD host/master using an enhanced SD direct command to establish a direct memory access (DMA) configuration to improve throughput over the SD bus using a DMA allocation.

Aspects of the disclosure relate to an unconventional use of secure digital (SD) direct commands for improving throughput by increasing meta-channel communications between SD client devices and an SD host/master. In one aspect of the present disclosure, an enhanced SD direct command is used for communicating metadata between an SD master device and an SD slave device in parallel with data communications between the SD master device and the SD slave device. This metadata may include DMA metadata regarding upcoming transmit data between the SD master device and the SD slave device. The DMA metadata may also include data regarding upcoming read data between the SD master device and the SD slave device. In this aspect of the present disclosure, the enhanced SD direct command enables communication of multiple bytes of DMA metadata between the SD host device and the SD client device.

FIG. 1 illustrates an example implementation of a host system-on-a-chip (SOC) 100, which includes a connectivity block 110 configured to provide an enhanced secure digital (SD) direct command over an SD bus to increase meta-channel communications, in accordance with aspects of the present disclosure. The host SOC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, USB connectivity, Bluetooth connectivity, Secure Digital (SD) connectivity, and the like.

In this configuration, the host SOC 100 includes various processing units that support multi-threaded operation. For the configuration shown in FIG. 1, the host SOC 100 includes a multi-core central processing unit (CPU) 102, a graphics processor unit (GPU) 104, a digital signal processor (DSP) 106, and a neural processor unit (NPU) 108. The host SOC 100 may also include a sensor processor 114, image signal processors (ISPs) 116, a navigation module 120, which may include a global positioning system, and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advance RISC machine (ARM), a microprocessor, or some other type of processor. The NPU 108 may be based on an ARM instruction set.

In an aspect of the present disclosure, the instructions loaded into the multi-core CPU 102 may include program code to access, during a current data transfer over data lines of the SD bus, a first direct memory access (DMA) metadata and a second DMA metadata over a command (CMD) line of the SD bus using an enhanced SD direct command. The instructions loaded into the multi-core CPU 102 may also include program code to establish, prior to a next data transfer over the data lines of the SD bus, a DMA configuration for the next data transfer based on the first DMA metadata and the second DMA metadata. In addition, the instructions loaded into the multi-core CPU 102 may include program code to communicate the next data transfer over the data lines of the SD bus according to the DMA configuration.

Figure 2:
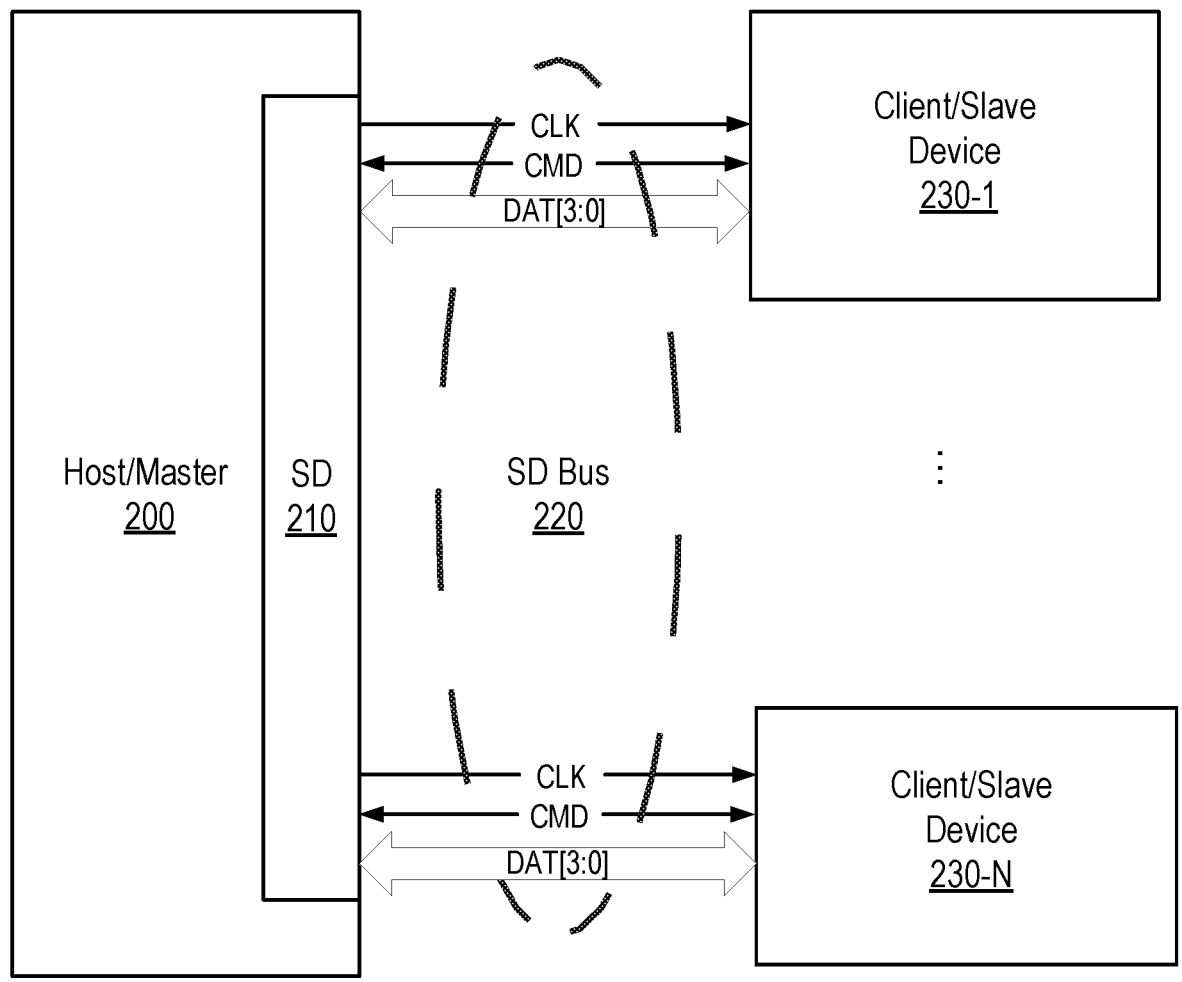
FIG. 2 illustrates an example implementation of signal pins for a secure digital (SD) host communicably coupled to SD slave devices in a host/slave SD input/output (SDIO) configuration, in accordance with aspects of the present disclosure.

FIG. 2 is an example implementation illustrating signal pins for a secure digital (SD) host communicably coupled to SD slave devices in a host/slave SD input/output (SDIO) configuration, in accordance with aspects of the present disclosure. In this configuration, a host/master 200 may be the host SOC 100, or a block of the host SOC 100, such as the connectivity block 110 or other like block of the host SOC 100, including a secure digital (SD) controller/interface 210. In this example, the host/master 200 includes the SD controller/interface 210, configured to communicate with client/slave devices 230 (230-1, . . . , 230-N) over an SD bus 220.

The SD bus 220 is configured according to the SDIO protocol and carries a clock (CLK) signal, an SD command (CMD) signal, and a data signal (DAT[3:0]). As noted above, the SDIO protocol is entirely driven by the host/master 200. As a result, the client/slave devices 230 cannot initiate any data transfers. In operation, the host/master 200 uses SD commands for controlling data transfers as well as communications to/from the client/slave devices 230. For example, the host/master 200 uses an SD direct command (e.g., command fifty-two (CMD52)) for performing byte reads and issuing abort commands. The host/master 200 uses an SD extended command (e.g., command fifty-three (CMD53)) for performing burst reads and writes from/to the client/slave devices 230. That is, an SD extended command may be a CMD53 read command or a CMD53 write command.

The host/master 200 is generally configured to perform burst data transfers using the CMD53 command for performing both read and write operations. In operation, a command header is communicated from the host/master 200 to a client/slave device 230-1 prior to data transfer. The command header generally indicates a packet data size and is immediately followed by the packet data. A dataflow from the host/master 200 to the client/slave devices 230 may be referred to as a transmit direction. By contrast, a dataflow from the client/slave devices 230 to the host/master 200 may be referred to as a receive direction.

In the transmit direction, an ability of the client/slave devices 230 to accept incoming data from the host/master 200 is dependent on a dynamic memory scenario of a target of the client/slave devices 230, such as the client/slave device 230-1. In particular, without knowledge of the size of the incoming data, a client device driver of the client/slave device 230-1 is forced to use static memory allocation for the client/slave device 230-1, which avoids data transfer throughput loss. The buffer space of the client/slave device 230-1 is specified to accommodate incoming packet data from the host/master 200. Unfortunately, once the buffer space is filled with incoming packet data, the client/slave device 230-1 is configured to allocate another (e.g., next) buffer space. The next buffer space is allocated when a subsequent command header indicates a next packet from the host/master 200, while the previously allocated buffer space is being consumed by software.

In operation, an allocated buffer space is specified to accommodate a minimum of two maximum sized data packets for a given system (e.g., for a system with a block size of five hundred twelve (512) bytes, a single packet can be a maximum of two hundred fifty-six (256) kilobytes (KB), thus specifying 512 kilobytes (KB) for buffer space allocation). Unfortunately, there is no guarantee that incoming packet is of the maximum size specified for buffer allocation. Hence, maintaining a maximum buffer allocation size is a non-optimal usage of the limited memory resources available in a system. This non-optimal usage results in detrimental effects, including decreased system speed and increased system cost.

According to the SDIO protocol, in the transmit direction, the client/slave devices 230 cannot communicate their current ability to accept the incoming transmit data. For example, the ability of the client/slave device 230-1 to accept incoming transmit data depends on dynamic memory scenario of the client/slave device 230-1. Where software does not use static memory allocation, the client/slave device 230-1 delays the data transfer until the predetermined amount of buffer space is allocated by the client device driver. This delay for allocating the buffer space leads to significant gaps on the SD bus 220. The delay also decreases a transmit throughput on the SD bus 220.

Unfortunately, there are situations where the host/master 200 has multiple independent streams of different size data packets for the client/slave devices 230. Without any knowledge of the dynamic memory situation of the client/slave devices 230, the host/master 200 cannot intelligently select an efficient order of transmitting the independent data packet streams to the client/slave devices 230. That is, the static buffer management for configuring the buffer space of the client/slave devices 230 is simple but wasteful due to lack of advance information (e.g., metadata) from the host/master 200 and/or the client/slave devices 230.

In a receive direction (e.g., dataflow from client/slave device 230 to the host/master 200), the host/master 200 reads packet data from the client/slave devices 230. For example, a client/slave device 230-1 may acquire data from another interface (e.g., a Bluetooth device and/or a wireless local area network (WLAN) through the connectivity block 110) for transfer to the host/master 200. Unfortunately, the host/master 200 does not have an efficient means of determining a size of data being read from one of the client/slave device 230-1. In current operation, the host/master 200 performs several reads into the client/slave devices 230 to gather specified information before initiating data read transactions over the SD bus 220 from one of the client/slave devices 230. These extra transactions over the SD bus 220 before performing the burst data transfer decrease read data throughput on the SD bus 220.

One option for reducing transmit path throughput loss is dynamic memory allocation by the client device drivers of the client/slave devices 230. This solution offers a small memory footprint by using on demand memory allocation for the client/slave devices 230. In this option, the client/slave devices 230 maintain a queue of descriptors and maintain a pool of small number of buffers, each of a fixed small size (e.g., 512 bytes) for storing transmitted packet data from the host/master 200. Once a data packet is transmitted from the host/master 200, the client device driver for one of the client/slave devices 230 allocates a target buffer from available memory.

Unfortunately, if the packet data is large, the availability of fixed size buffers in a pool may be exhausted, while additional buffer space is desired. This is referred to as an out-of-buffer (OOB) condition and it persists until the client device driver processes transferred data and releases buffers to hardware maintained by the target client/slave device. The OOB condition alternatively persists until the client device driver adds additional buffers in the pool by allocating more memory from the system memory. Delay caused by the OOB descriptor scenario could be avoided if the client device driver was informed of buffer specifications for incoming packet data, rather than operating in a reactive mode.

Another option involves the client/slave devices 230 maintaining buffer state information for different memory channels (e.g., direct memory access (DMA) channels). The client/slave devices 230 may communicate this buffer state information to the host/master 200 by issuing an interrupt to the host/master 200. The host/master 200 may read metadata (e.g., the buffer state information) from the client/slave devices 230 using the second SDIO direct command (e.g., CMD53) over the data lines (e.g., DAT[3:0]). The host/master 200 can then make intelligent scheduling decisions for packet transmission by knowing the buffer state information (e.g., metadata) of the client/slave devices 230.

This option, however, introduces significant delay based on a write scheduling process for acquiring the limited amount of buffer state metadata over the data lines (e.g., DAT[3:0]) from the client/slave devices 230, performed before each data packet write. This write scheduling process includes the interrupt from the client/slave devices 230 to hardware of the host/master 200 followed by interrupting of a host processor. The host processor then initiates software thread activation for pushing a CMD53 read command to hardware of the host/master 200 and performing a CMD53 write operation to acquire the buffer state metadata. This write scheduling process further includes providing the buffer state metadata to the device driver, making the write scheduling decision, and pushing a CMD53 write command to the hardware of the host/master 200 to transfer packet data to the client/slave devices 230.

The noted write scheduling process introduces significant delays. Reducing receive path throughput loss is a significant problem because the host/master 200 does not know the size of read packet data prior to a read operation. To solve this problem, the client/slave devices 230 interrupt the host to provide metadata for each read packet that the host/master 200 is pulling from one of the client/slave devices 230. This option, however, introduces significant delay for acquiring a limited amount of read state metadata over the data lines (e.g., DAT[3:0]) from the client/slave devices 230, performed before each data packet read operation.

This metadata acquisition process includes the interrupt from the client/slave devices 230 to hardware of the host/master 200 followed by interrupting of a host processor. The host processor then initiates software thread activation for pushing a CMD53 read command to hardware of the host/master 200 and performing a CMD53 read operation. This metadata acquisition process further includes providing the read state metadata to the device driver, the device driver allocating a buffer, and pushing a CMD53 read command to the hardware of the host/master 200. This metadata acquisition process introduces significant delays. The memory footprint incurred by the metadata acquisition process, however, is not an issue for the receive path (e.g., dataflow from the client/slave devices 230 to the host/master 200) because the host/master 200 learns the read data size before initiating a data transfer on the SD bus 220.

As noted above, the SDIO protocol specifies a maximum data size for each packet (e.g., 256 KB per packet). The metadata (e.g., transmit path metadata and or receive path metadata) for supporting writing and/or reading of a 256 KB package is approximately one to two (1-2) bytes. The metadata includes the number of blocks (e.g., 512 bytes/block) for data transfers (9 bits) and a direct memory access (DMA) channel number (2-4 bits). Using a CMD53 read/write command to provide a block data stream to transfer the small amount (e.g., 1-2 bytes) of metadata is a significant waste of resources on the SD bus 220.

The SDIO protocol, however, provides the CMD52 command to transact one byte between the host/master 200 and the client/slave devices 230 using only the command (CMD) pin of the SD bus 220. Notably, the SDIO protocol conventionally prohibits the CMD52 command from being simultaneously active (e.g., performed in parallel) with the CMD53 command on the SD bus 220. In particular, standard SD host drivers (e.g., Linux standard SD host drivers) block other commands from being active on the SD bus 220 while the CMD53 command is active on the SD bus 220. Generally, only an abort command is unblocked during an active CMD53 command. This abort command may be sent simultaneously with the CMD53 command for special handling.

According to this aspect of the present disclosure, an SD host driver of the host/master 200 is modified to enable activation of a CMD52 command simultaneously with an active CMD53 command on the SD bus 220, as desired. This simultaneous activation of the CMD52 and CMD53 commands on the SD bus 220 conforms with the SD specification of the SDIO protocol. In this aspect of the present disclosure, the SD host driver of the host/master 200 is provided with two independent channels for communicating with the client/slave devices 230. As described, a meta-channel may refer to a CMD52 channel, and a data-channel may refer to a CMD53 channel. This CMD52 based meta-channel over the CMD line enables information exchange for setting up DMA channels for future transfer while an active transfer is in progress over data lines (e.g., DAT[3:0]). A meta-channel for communicating between the host/master 200 and the client/slave devices 230 to enable efficient use of the data-channel of the SD bus 220, for example, as shown in FIG. 3.

Figure 3:
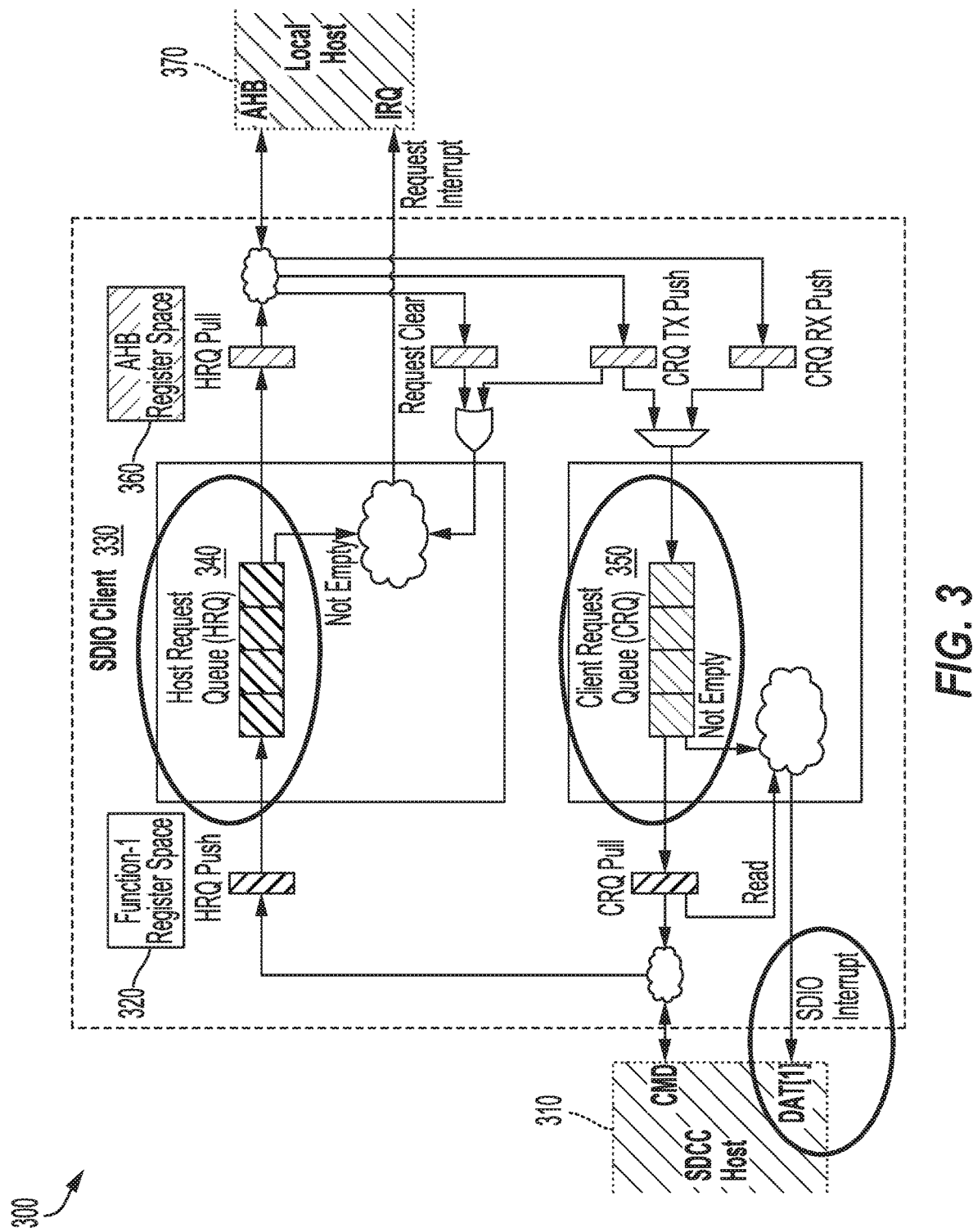
FIG. 3 is a block diagram showing a host/slave secure digital (SD) input/output (SDIO) configuration, further illustrating the host/slave SDIO configuration of FIG. 2, in accordance with aspects of the present disclosure.

FIG. 3 shows a host/slave secure digital (SD) input/output (SDIO) configuration 300, further illustrating the host/slave SDIO configuration of FIG. 2, in accordance with aspects of the present disclosure. Representatively, an SDIO client interface 330 includes a host request queue (HRQ) 340 and a client request queue (CRQ) 350. The SDIO client interface 330 also includes a first register space (e.g., function-1 register space) 320 and a second register space (e.g., advanced high performance bus (AHB)) register space) 360. SD host hardware 310 (e.g., an SD card controller) may access the function-1 register space 320 and client hardware 370 (e.g., local host processor) may access the AHB register space 360. The host request queue 340 (HRQ) and the client request queue 350 (CRQ) provide a medium for exchanging metadata between the SD host hardware 310 and the client hardware 370.

The host/slave SDIO configuration 300 may operate to perform a host to client transfer (e.g., a transmit path dataflow) as follows. When the SD host hardware 310 (e.g., the host/master 200) has a packet to send to the client hardware 370 (e.g., client/slave devices 230), the SD host hardware 310 pushes a two-byte entry onto the host request queue 340 (e.g., HRQ push). The SD host hardware 310 pushes the two-byte entry onto the host request queue 340 by issuing two CMD52 commands on the command (CMD) pin of, for example, the SD bus 220 of FIG. 2. Issuing the two CMD52 commands is allowed even if the data pins (e.g., DAT[3:0]) of the SD bus 220 are busy transferring data. This two-byte entry of metadata may include the block count (13 bits) and a request identification (ID) that is returned as response metadata from the client hardware 370 in response to the second CMD52.

In this example, the HRQ push triggers an interrupt (e.g., Request Interrupt) to an interrupt request queue (IRQ) pin of the client hardware 370. In response, a client device driver (not shown) allocates a specified amount of requested buffer space according to the block count. Once allocated, the client device driver pushes response metadata in the client request queue 350 (e.g., CRQ TX push). The response metadata may include the request ID (4 bits) and a direct memory access (DMA) channel (e.g., 2 bits, assuming 4 DMA channels). The CRQ TX push triggers an in-band interrupt sent to the SD host hardware 310. This in-band interrupt of the SD host hardware 310 does not affect any current data transfers on the data pins (e.g., DAT[3:0]) of the SD bus 220.

As illustrated in FIG. 3, an SDIO interrupt is issued on a data pin (e.g., DAT[1]) of the SD host hardware 310, without affecting the current data transfer on the SD bus 220. In response, the SD host hardware 310 pulls (e.g., CRQ pull) the response metadata from the client request queue 350 via a CMD52 command. Based on the response metadata from the HRQ entry, which includes the request ID and the DMA channel, the SD host hardware 310 determines the client device driver has provisioned a specified buffer size as well as the DMA channel to be used. The SD host hardware 310 awaits completion of the current data transfer over the SD bus 220. Once the current data transfer completes, the SD host hardware 310 triggers a packet write on the data pins (e.g., DAT[3:0]) of the SD bus 220 using a CMD53 command. The end result is back-to-back packet data transfers on the data pins (e.g., DAT[3:0]) of the SD bus 220. The back-to-back data transfers result in near bus level throughput at the device driver level.

The host/slave SDIO configuration 300 may operate to perform a client to host transfer (e.g., a receive path dataflow) as follows. When the client hardware 370 (e.g., client/slave devices 230) has a read packet for the SD host hardware 310 (e.g., the host/master 200), the client hardware 370 pushes a two-byte entry of read metadata onto the client request queue 350 (e.g., CRQ RX Push). The client hardware 370 pushes the two-byte entry of read metadata onto the client request queue 350 to notify the SD host hardware 310 of the read data available from the client hardware 370. This two-byte entry of read metadata may include the block count (13 bits) and a DMA channel number (2 bits).

An SDIO interrupt is issued on a data pin (e.g., DAT[1]) of the SD host hardware 310, without affecting the current data transfer on the SD bus 220. In response, the SD host hardware 310 pulls an entry (e.g., CRQ pull) from the client request queue 350 via two CMD52 commands. Based on the read metadata in the CRQ entry, which includes the block count and the DMA channel, the SD host hardware 310 determines the client hardware 370 has a read packet for the SD host hardware 310 to pull. In response, an SD host driver of the SD host hardware 310 allocates a host buffer (based on the block count) in a memory space of the SD host hardware 310 and awaits completion of the current data transfer over the SD bus 220. Once the current packet data transfer completes, the SD host hardware 310 triggers a packet read on the data pins (e.g., DAT[3:0]) of the SD bus 220 using a CMD53 command to pull the read packet from the client hardware 370. The end result is also back-to-back packet data transfers on the data pins (e.g., DAT[3:0]) of the SD bus 220. The back-to-back data transfers also result in near bus level throughput at the device driver level.

Without the meta-channel solution described in FIG. 3, in-band communications between the host and client is performed to communicate metadata. These in-band communications, however, introduce latency into data packet transfers, resulting in throughput loss over the SD bus 220. Instead of using in-band communications, simultaneous activation of CMD52 commands and CMD53 commands over the SD bus 220 provides a substantial throughput gain (e.g., 43%), approaching a maximum throughput possible with SD protocol overhead.

Direct memory access (DMA) provides a further opportunity for substantial throughput gain over the SD bus 220. Performing DMA setup using the meta-channel solution, however, involves two or four data transfers (e.g., 2 or 4 bytes), depending on a number of supported DMA channels. This results in the host/master 200 issuing two or four CMD52 commands over CMD lines of the SD bus 220 for DMA setup because the CMD52 command is limited to reading or writing one byte of data. Significant overhead, however, is specified for each issued CMD52 command. For example, for each issued CMD 52 command, the host/master 200 fetches command elements from memory. Once fetched, the host/master 200 performs setup for the CMD52 command, executes the CMD52 command, receives response to the CMD52 command, and interrupts the local processor for processing the response. In addition, instruction set register (ISR) execution is performed by software, which involves context switching overhead.

This significant overhead consumes nearly two hundred microseconds (200 us) for each issued CMD52 command. Thus, approximately four hundred microseconds (400 us) are consumed just for transferring two CMD52 commands over the CMD line of the SD bus 220. This four hundred microseconds (400 us), in addition to other overhead, results in a total measured delay of approximately seven hundred microseconds (700 us). This measured delay is approximately equal to the amount of time consumed when performing a maximum data size (e.g., 512 byte) data transfer over DAT[3:0] lines of the SD bus 220. With concurrency, this delay exceeds the data transfer time for the maximum data size on the DAT[3:0] lines of the SD bus 220, effectively making DMA setup time longer than a current data transfer time.

Consequently, the significant DMA setup time using the CMD52 command meta-channel inevitably delays the next data transfer time, resulting in throughput loss over the SD bus 220. That is, the limitation of transferring only one read/write byte for each CMD52 command results in a DMA setup time that exceeds the current data transfer time and delays the next data transfer time. According to aspects of the present disclosure, an enhanced SD direct command (e.g., enhanced CMD52 command) is described to expand the read/write byte limitation of a conventional CMD52 command, for example, as shown in FIGS. 4A and 4B.

Figure 4A:
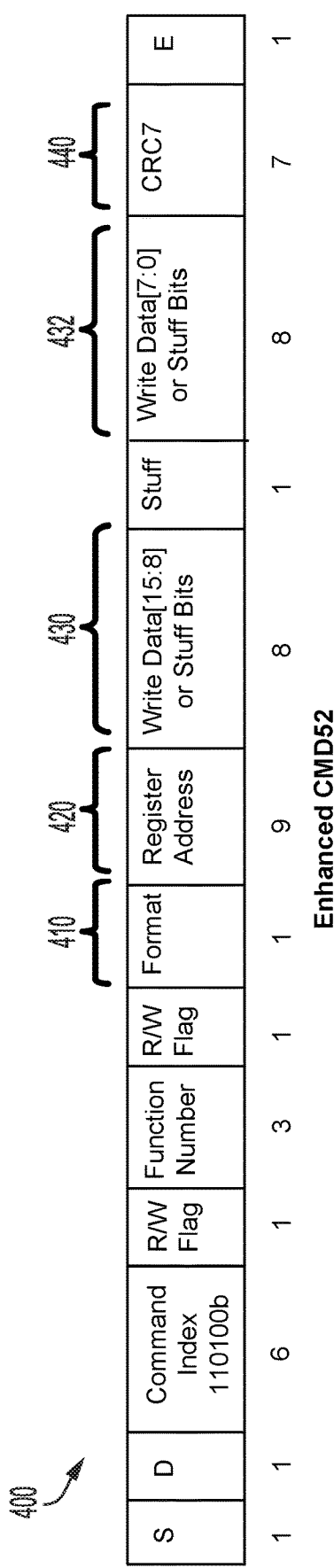
FIGS. 4A and 4B are block diagrams illustrating an enhanced secure digital (SD) direct command and an enhanced SD direct response with an expanded read/write data capacity, according to aspects of the present disclosure.
Figure 4B:
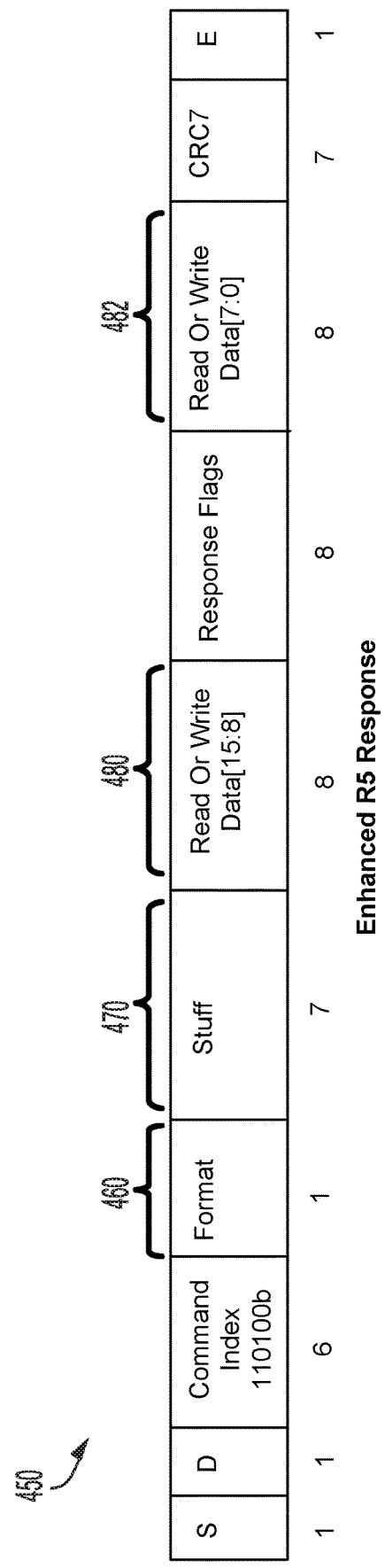

FIGS. 4A and 4B are block diagrams illustrating an enhanced secure digital (SD) direct command and an enhanced SD direct response with an expanded read/write data capacity, according to aspects of the present disclosure.

FIG. 4A shows an enhanced SD direct command 400, according to aspects of the present disclosure. In this configuration, the enhanced SD direct command 400 includes the following updated/additional fields: (1) a format field 410; (2) a register address field 420; (3) a first write data field 430, and (4) a cyclic redundancy check (CRC) field 440. Other fields of the enhanced SD direct command 400 are described with reference to the specification for input/output (I/O) read/write direct command (e.g., CMD52) of the SDIO protocol. A second write data field 432 of the enhanced SD direct command 400 is combined with the first write data field 430 to double a capacity of meta-channel communications.

Performing DMA setup involves programing DMA setup registers, which are local to an SDIO controller of the SDIO client interface 330 and reside in the lower address block of a one hundred twenty-eight thousand (128K) address space. That is, DMA setup registers are within the first two hundred fifty-six (256) addresses of the 128K address space, rather than the later 256 address block of the 128K address space, which is accessible using a full seventeen (17) bit address. Hence, access to the DMA setup registers may be performed without using the full 17 bit address specified by the CMD52 command description from the SDIO protocol. Aspects of the present disclosure provide the enhanced SD direct command 400 to transfer two (2) bytes, effectively eliminating issuance of a second SD direct command (e.g., CMD52), as specified by the meta-channel solution described above.

According to aspects of the present disclosure, the enhanced SD direct command 400 includes the register address field 420, having a field length of nine (9) bits, which is reduced from the 17 bit register address field length of the CMD52 command description from the SDIO protocol. In this configuration, the first write data field 430 is added to the enhanced SD direct command 400 by using the spare eight (8) bits provided by reducing the length of the register address field 420. The format field 410 is added to the enhanced SD direct command 400 and the CRC field 440 is modified as follows.

In operation, the host/master 200 of FIG. 2 sends the enhanced SD direct command 400, which is backward compatible, using, for example, a different CRC7 polynomial (e.g., $G(X)=X^7+X^4+1$) from the CRC field 440 relative to the original polynomial (e.g., $G(X)=X^7+X^3+1$). In this example, the format field 410 is set to a one (1) value when the enhanced SD direct command 400 is used with the different CRC7 polynomial in the CRC7 field 440. By contrast, the format field 410 is set to a zero (0) value when a conventional SD direct command (e.g., CMD52) is used with the original CRC7 polynomial. When the client/slave device 230 does not support the enhanced SD direct command 400, a CRC check performed by the client/slave device 230 fails due to the use of the original CRC7 polynomial, for example, as shown in FIG. 5.

FIG. 4B illustrates an enhanced SD direct response 450, according to aspects of the present disclosure. In this configuration, the enhanced SD direct response 450 includes the following updated/additional fields: (1) a format field 460; (2) a stuff field 470; and (3) a first read/write data field 480. Other fields of the enhanced SD direct response 450 are described with reference to the specification for input/output (I/O) read/write direct command (e.g., CMD52) of the SDIO protocol. A second read/write data field 482 of the enhanced SD direct response 450 is combined with the first read/write data field 480 to double a capacity of meta-channel communications.

According to this aspects of the present disclosure, the enhanced SD direct response 450 (e.g., enhanced R5 response) supports transport of sixteen (16) bits of read data within the first read/write data field 480 and a second read/write data field 482. In addition, the enhanced SD direct response 450 uses the original CRC7 polynomial format (e.g., $G(X)=X^7+X^3+1$). As shown in FIG. 2, the client/slave device 230 issues the enhanced SD direct response 450 to the enhanced SD direct command 400 from the host/master 200, when a CRC check performed by the client/slave device 230 is a success due to the use of the different CRC7 polynomial (e.g., $G(X)=X^7+X^4+1$), for example, as shown in FIG. 5.

Figure 5:
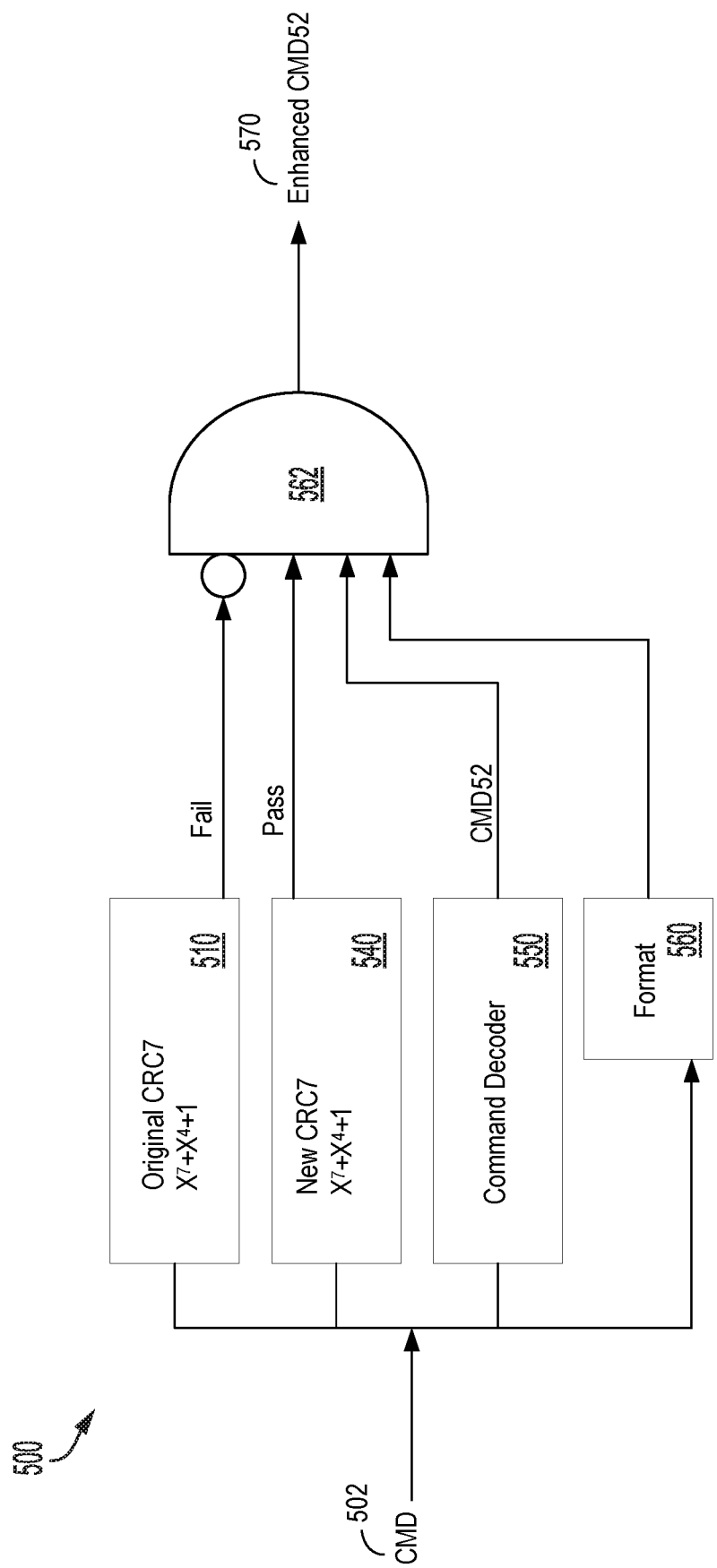
FIG. 5 is a block diagram illustrating a hardware configuration of the SD client device of FIG. 2 to support the enhanced secure digital (SD) direct command of FIGS. 4A and 4B, according to aspects of the present disclosure.

FIG. 5 is a block diagram illustrating a portion of a hardware configuration 500 of a secure digital (SD) client device to support the enhanced SD direct command 400 and the enhanced SD direct response 450 of FIGS. 4A and 4B, according to aspects of the present disclosure. In this configuration, the hardware configuration 500 of the SD client devices include an original CRC7 block 510, a new CRC7 block 540, a command decoder 550, and a format block 560, which each receive an input command (e.g., input CMD 502). A logic gate 562 of the hardware configuration 500 identifies the input CMD 502 as an enhanced SD direct command 570 as follows.

In this example, an SD client device determines whether the enhanced SD direct command 400 and the enhanced SD direct response 450 are supported by calculating a CRC check using the original CRC7 block 510 and the new CRC7 block 540 on all incoming commands (e.g., input CMD 502). If the original CRC7 block 510 fails, AND the new CRC7 block 540 passes, AND the command decoder 550 identifies the input CMD 502 as an SD direct command (e.g., CMD52), AND the format block 560 detects a flag is set (e.g., in the format field 410=1), then the command is considered an enhanced SD direct command 570 (e.g., enhanced CMD52). The enhanced SD direct command 570 supports up to five hundred twelve bytes (512B) of addresses. These addresses may be mapped to local custom configuration registers. The enhanced SD direct command 570 supports a total of 16 bits of write data, which may be transported over the CMD lines of the SD bus 220.

By transferring 16 bit DMA metadata using the meta-channel provided by the enhanced SD direct command 570 in one command transfer, a driver of the host/master 200 no longer issues two SD direct commands (e.g., CMD52) for DMA setup via the meta-channel technique. This enables a setup of the DMA channel for the subsequent transfer within five hundred microseconds (500 us), while a current data transfer happens on data lines DAT[3:0]. This setup of the DMA channel results in back-to-back payload transfer on data lines DAT[3:0] of the SD bus 220, without any DMA setup configuration data on the data lines DAT[3:0]. The DMA setup configuration data is omitted from the data lines DAT[3:0] because the DMA setup is performed over the meta-channel provided by the enhanced SD direct command/response well before start of the subsequent payload transfer.

Referring again to FIG. 2, performing back-to-back payload transfer on data lines DAT[3:0] of the SD bus 220 enables attaining maximum theoretical throughput of seven hundred forty-nine megabits per second (749 Mbps). Without being able to completely hide DMA setup overhead, conventional techniques fail to attain this throughput level. That is, the meta-channel communications supported by the enhanced SD direct command 570 is a solution that provides a unique competitive advantage. According to aspects of the present disclosure, the use of the enhanced CMD52 format is performed over the SD command line/PCB traces (e.g., CMD lines) of the SD bus 220 between host/master 200 (e.g., SOC) and the client/slave devices 230 (e.g., SDIO client SOC).

Figure 6:
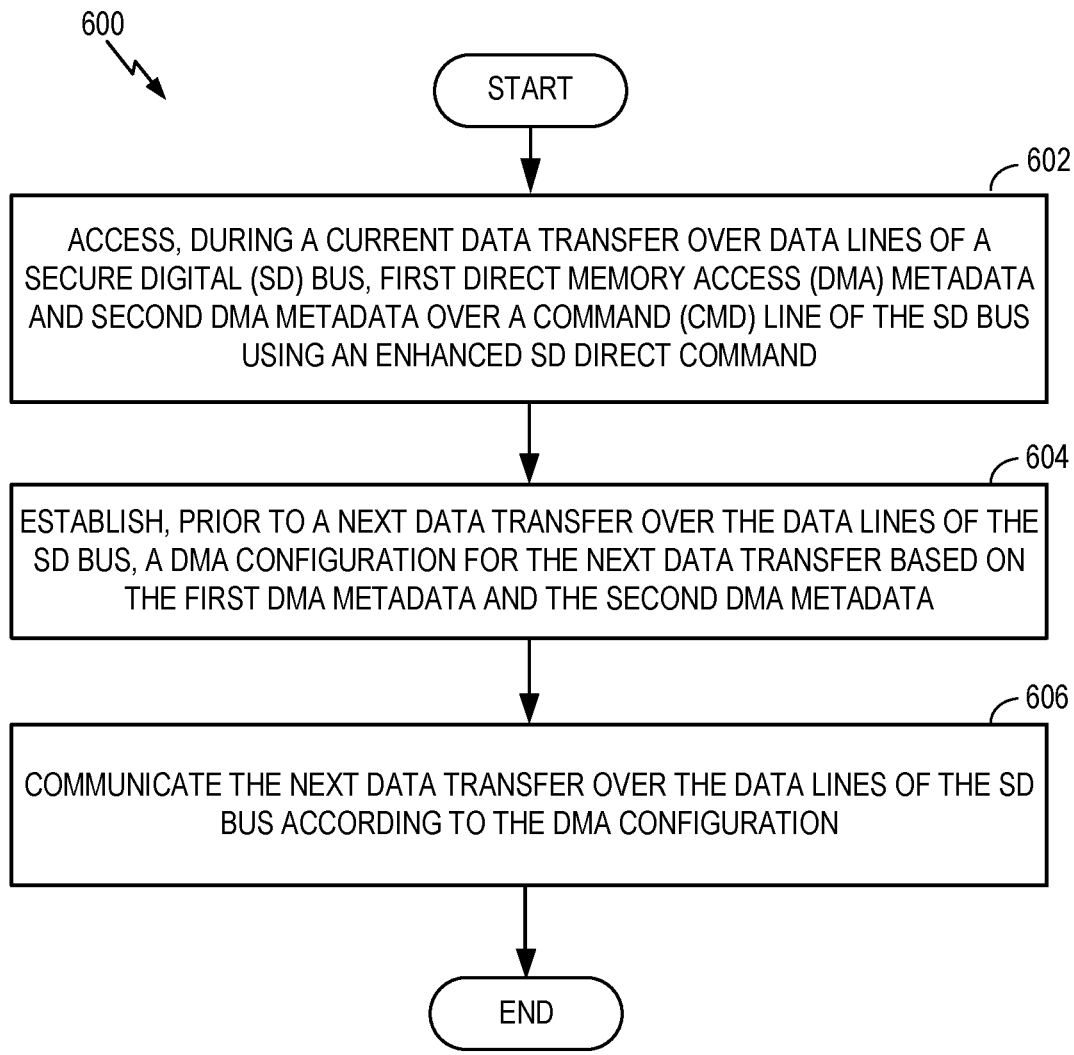
FIG. 6 is a flow diagram illustrating a method of improving meta-channel communications over a secure digital (SD) bus between an SD host and an SD client device, according to aspects of the present disclosure.

FIG. 6 is a flow diagram illustrating a method of improving meta-channel communications over a secure digital (SD) bus between an SD host and an SD client device, according to aspects of the present disclosure. A method 600 begins at block 602, by accessing, during a current data transfer over data lines of the SD bus, a first direct memory access (DMA) metadata and a second DMA metadata over a command (CMD) line of the SD bus using an enhanced SD direct command. For example, as illustrated in FIGS. 2 and 4A, a first DMA metadata (e.g., a first byte of DMA metadata) is provided in the first write data field 430 and the second DMA metadata (e.g., a second byte of DMA metadata) is provided in a second write data field 432.

At block 604, a DMA configuration is established for a next data transfer based on the first DMA metadata and the second DMA metadata during the current data transfer over the data lines of the SD bus. For example, as shown in FIG. 3, the first DMA metadata and the second DMA metadata include a block count of a data packet and a DMA channel number to access the data packet, communicated with the enhanced SD direct command 400. At block 606, the next data transfer is communicated over the data lines of the SD bus according to the DMA configuration. For example, as shown in FIG. 2, the host/master 200 uses an SD extended command (e.g., command fifty-three (CMD53)) for performing burst reads and writes from/to the client/slave devices 230 based on the DMA configuration. That is, an SD extended command may be a CMD53 read command or a CMD53 write command.

One aspect of the present disclosure describes an apparatus for improving synchronization over a secure digital (SD) bus between an SD host and an SD client device including means for accessing, during a current data transfer over data lines of the SD bus, a first DMA metadata and a second DMA metadata over a CMD line of the SD bus using an enhanced SD direct command; means for establishing, prior to a next data transfer over the data lines of the SD bus, a DMA configuration for the next data transfer based on the first DMA metadata and the second DMA metadata; and/or means for communicating the next data transfer over the data lines of the SD bus according to the DMA configuration. In one configuration, the accessing means and/or the communicating means may be the host/master 200 and/or the client/slave devices 230, as shown in FIGS. 2 and 3. In another aspect, the aforementioned means may be any structure or any material configured to perform the functions recited by the aforementioned means.

Figure 7:
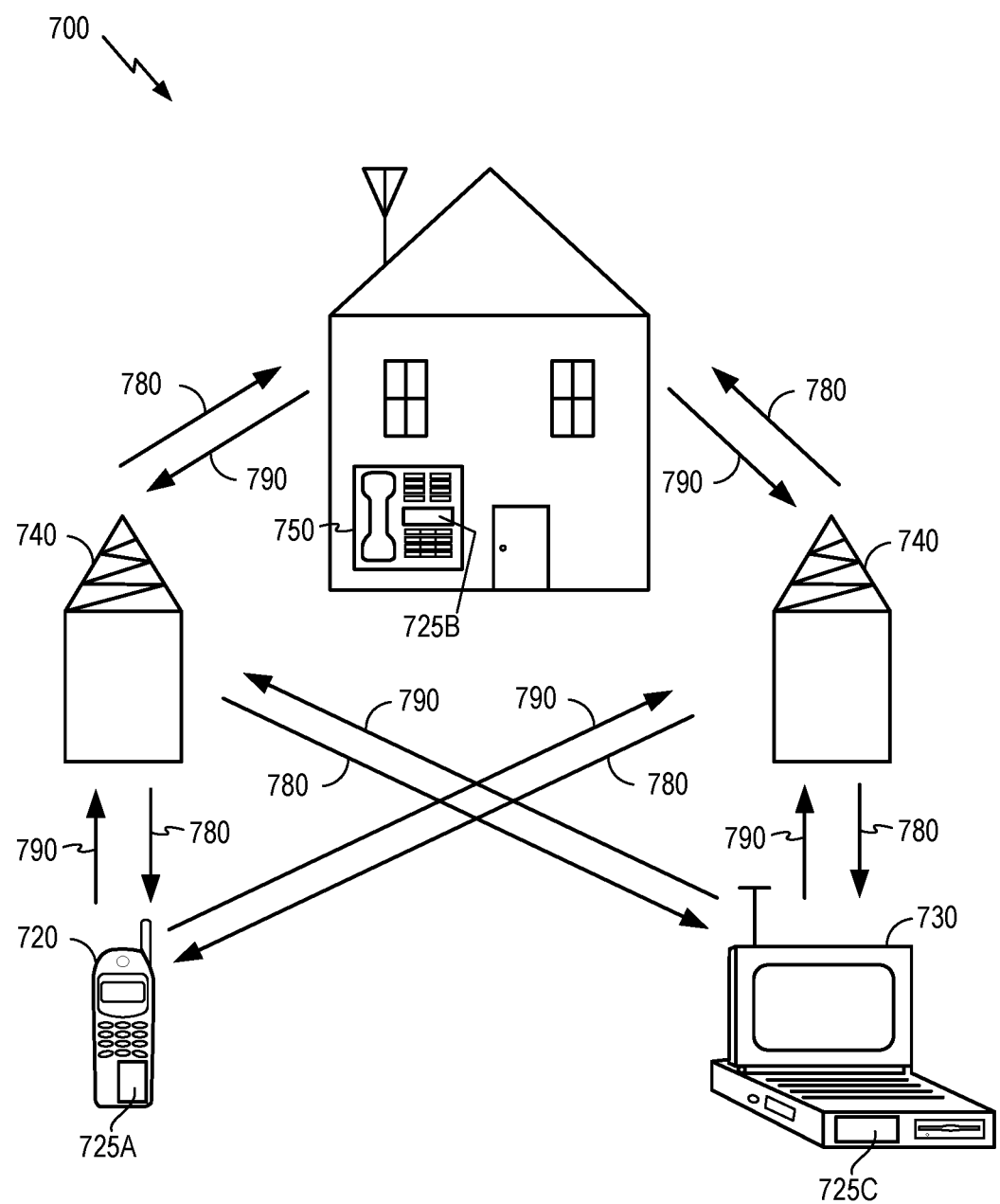
FIG. 7 is a block diagram showing a wireless communications system in which a configuration of the disclosure may be advantageously employed.

FIG. 7 is a block diagram showing an exemplary wireless communications system 700 in which a configuration of the disclosure may be advantageously employed. For purposes of illustration, FIG. 7 shows three remote units 720, 730, and 750 and two base stations 740. It will be recognized that wireless communications systems may have many more remote units and base stations. Remote units 720, 730, and 750 include IC devices 725A, 725B, and 725C, which support the enhanced SD direct command. It will be recognized that any device containing an IC may also support the enhanced SD direct command, including the base stations, switching devices, and network equipment. FIG. 7 shows forward link signals 780 from the base station 740 to the remote units 720, 730, and 750, and reverse link signals 790 from the remote units 720, 730, and 750 to base stations 740.

In FIG. 7, a remote unit 720 is shown as a mobile telephone, a remote unit 730 is shown as a portable computer, and a remote unit 750 is shown as a fixed location remote unit in a wireless local loop system. For example, the remote units may be a mobile phone, a hand-held personal communications systems (PCS) unit, a portable data unit such as a personal data assistant, a GPS enabled device, a navigation device, a set top box, a music player, a video player, an entertainment unit, a fixed location data unit such as meter reading equipment, or any other device that stores or retrieves data or computer instructions, or any combination thereof. For example, a remote unit including the low power memory sub-system may be integrated within a vehicle control system, a server computing system or other like system specifying critical data integrity. Although FIG. 7 illustrates IC devices 725A, 725B, and 725C, which support the enhanced SD direct command, the disclosure is not limited to these exemplary illustrated units. Aspects of the present disclosure may be suitably employed in any device, which support the enhanced SD direct command.

For a firmware and/or software implementation, the methodologies may be implemented with modules (e.g., procedures, functions, and so on) that perform the described functions. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer. Disk and disc, as used herein, include compact disc (CD), laser disc, optical disc, digital versatile disc (DVD) and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communications media including any medium that facilitates transfer of a computer program from one place to another. A storage media may be any available media that can be accessed by a general-purpose or special-purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD) and Blu-ray disc, where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "a step for."

What is claimed is:

1. A method of improving meta-channel communications over a secure digital (SD) bus between an SD host and an SD client, the method comprising:

accessing, during a current data transfer over data lines of the SD bus, a first direct memory access (DMA) metadata and a second DMA metadata over a command (CMD) line of the SD bus using an enhanced SD direct command;

establishing, prior to a next data transfer over the data lines of the SD bus, a DMA configuration for the next data transfer based on the first DMA metadata and the second DMA metadata; and communicating the next data transfer over the data lines of the SD bus according to the DMA configuration.

2. The method of claim 1, further comprising:

embedding a first byte of DMA metadata in a first byte of the enhanced SD direct command as the first DMA metadata;

embedding a second byte of DMA metadata in a second byte of the enhanced SD direct command as the second DMA metadata; and issuing the enhanced SD direct command to the SD client over the CMD line of the SD bus.

3. The method of claim 1, in which accessing the first DMA metadata and the second DMA metadata comprises:

reading the first DMA metadata from a first byte of an enhanced SD direct response to the enhanced SD direct command; and reading the second DMA metadata from a second byte of the enhanced SD direct response to the enhanced SD direct command.

4. The method of claim 1, in which communicating comprises accessing a read packet through a direct memory access (DMA) channel indicated by the DMA configuration.

5. The method of claim 4, in which accessing comprises:

reading the read packet through the DMA channel over the data lines of the SD bus from the SD client using an SD extended command; and storing the read packet in a host buffer allocated according to the DMA configuration.

6. The method of claim 1, in which the first DMA metadata and the second DMA metadata comprise a block count of a read packet and a DMA channel number to access the read packet from the SD client with an SD extended command.

7. The method of claim 6, in which the SD extended command comprises a CMD53 command.

8. The method of claim 6, in which the enhanced SD direct command comprises an enhanced CMD52 command.

9. The method of claim 1, further comprising transmitting a write data packet from the SD host to the SD client over a DMA channel according to the DMA configuration.

10. The method of claim 1, further comprising incorporating the SD bus between the SD host and the SD client into one of a computing system, a mobile computing device, an Internet of Things device, or virtual reality or augmented reality system.

11. An apparatus configured to improve meta-channel communications over a secure digital (SD) bus between an SD host and an SD client, the apparatus comprising:

a memory comprising an SD device; and at least one processor coupled to the memory, the processor configured:

to access, during a current data transfer over data lines of the SD bus, a first direct memory access (DMA) metadata and a second DMA metadata over a command (CMD) line of the SD bus using an enhanced SD direct command;

to establish, prior to a next data transfer over the data lines of the SD bus, a DMA configuration for the next data transfer based on the first DMA metadata and the second DMA metadata; and to communicate the next data transfer over the data lines of the SD bus according to the DMA configuration.

12. The apparatus of claim 11, in which the processor is further configured:

to embed a first byte of DMA metadata in a first byte of the enhanced SD direct command as the first DMA metadata;

to embed a second byte of DMA metadata in a second byte of the enhanced SD direct command as the second DMA metadata; and to issue the enhanced SD direct command to the SD client over the CMD line of the SD bus.

13. The apparatus of claim 11, in which to access the first DMA metadata and the second DMA metadata, the processor is further configured:

to read the first DMA metadata from a first byte of an enhanced SD direct response to the enhanced SD direct command; and to read the second DMA metadata from a second byte of the enhanced SD direct response to the enhanced SD direct command.

14. The apparatus of claim 11, in which to communicate, the processor is further configured to access a read packet through a direct memory access (DMA) channel indicated by the DMA configuration.

15. The apparatus of claim 14, in which to access, the processor is further configured:

to read the read packet through the DMA channel over the data lines of the SD bus from the SD client using an SD extended command; and to store the read packet in a host buffer allocated according to the DMA configuration.

16. The apparatus of claim 11, in which the first DMA metadata and the second DMA metadata comprise a block count of a read packet and a DMA channel number to access the read packet from the SD client with an SD extended command.

17. The apparatus of claim 16, in which the SD extended command comprises a CMD53 command and the enhanced SD direct command comprises an enhanced CMD52 command.

18. A non-transitory computer-readable medium having program code recorded thereon to improve meta-channel communications over a secure digital (SD) bus between an SD host and an SD client, the program code executed by a processor and comprising:

program code to access, during a current data transfer over data lines of the SD bus, a first direct memory access (DMA) metadata and a second DMA metadata over a command (CMD) line of the SD bus using an enhanced SD direct command;

program code to establish, prior to a next data transfer over the data lines of the SD bus, a DMA configuration for the next data transfer based on the first DMA metadata and the second DMA metadata; and program code to communicate the next data transfer over the data lines of the SD bus according to the DMA configuration.

19. The non-transitory computer-readable medium of claim 18, in which the program code further comprises:

program code to embed a first byte of DMA metadata in a first byte of the enhanced SD direct command as the first DMA metadata;

program code to embed a second byte of DMA metadata in a second byte of the enhanced SD direct command as the second DMA metadata; and program code to issue the enhanced SD direct command to the SD client over the CMD line of the SD bus.

20. The non-transitory computer-readable medium of claim 18, in which the program code further comprises program code to transmit a write data packet from the SD host to the SD client over a DMA channel according to the DMA configuration.

* * * * *